Dec. 2, 1969 JAMES E. WEBB 3,482,179

ADMINISTRATOR OF THE NATIONAL AERONAUTICS AND SPACE ADMINISTRATION

BROADBAND STABLE POWER MULTIPLIER

Filed Sept. 15, 1967 4 Sheets-Sheet 1

GEORGE F. LUTES, JR.
KENNETH D. SCHREDER
*INVENTORS*

BY

ATTORNEYS

INVENTORS
GEORGE F. LUTES, JR.
KENNETH D. SCHREDER
BY
ATTORNEYS

EXCEPT AS SPECIFIED
RESISTANCE IN OHMS
CAPACITANCE IN pF
INDUCTANCE IN mH

INVENTORS
GEORGE F. LUTES, JR
KENNETH D. SCHREDER
BY
[signatures]
ATTORNEYS

Dec. 2, 1969 JAMES E. WEBB 3,482,179
ADMINISTRATOR OF THE NATIONAL AERONAUTICS
AND SPACE ADMINISTRATION
BROADBAND STABLE POWER MULTIPLIER
Filed Sept. 15, 1967 4 Sheets-Sheet 4

EXCEPT AS SPECIFIED
CAPACITANCE IN uF
INDUCTANCE IN mH

INVENTORS
GEORGE F. LUTES, JR
KENNETH D. SCHREDER
BY [signatures]
ATTORNEYS

United States Patent Office 3,482,179

Patented Dec. 2, 1969

3,482,179

BROADBAND STABLE POWER MULTIPLIER

James E. Webb, Administrator of the National Aeronautics and Space Administration, with respect to an invention of George F. Lutes, Jr., South Gate, and Kenneth D. Schreder, La Canada, Calif.

Filed Sept. 15, 1967, Ser. No. 668,248
Int. Cl. H03f *1/42, 3/10*
U.S. Cl. 330—31 3 Claims

ABSTRACT OF THE DISCLOSURE

A broadband stable power multiplier in which a balun is used in each amplitude-amplification stage of a multistage unit to provide broadboad impedance transformation. Also, a strip line is used to impedance match the very low input impedance of a broadband high power frequency transistor to the output impedance of a preceding power amplifier.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435 U.S.C. 2457).

BACKGROUND OF THE INVENTION

Field of the invention

This invention generally relates to power amplifying circuitry and, more particularly, to a solid state broadband stable power amplifier.

Description of the prior art

Broadband power amplifiers find use in commercial as well as military applications. One of the basic desired characteristics of such an amplifier is that it operates over a wide range of frequencies without tuning, i.e. be stable over a wide frequency range. One example of the use of such an amplifier is in high frequency broadband receiving systems of the type employed in a deep space instrumentation facility.

In some applications, particularly those associated with space, it is most important that the desired power amplification with or without frequency multiplying be achieved in the smallest physical configuration and weight.

Heretofore, the desired bandwidth and frequency multiplication factors or gain could only be achieved with a circuit which often exceeded physical size limitations. Thus, a need exists for a new broadband stable power amplifier.

OBJECTS AND SUMMARY OF THE INVENTION

It is a primary object of this invention to provide a new improved broadband power amplifier.

Another object of the invention is the provision of a broadband stable power multiplier which requires minimum tuning.

A further object of this invention is to provide a new improved broadband stable power multiplier in a smaller physical configuration than prior art multipliers.

Still a further object of this invention is to provide a novel highly stable solid state relatively small sized power multiplier which has a minimum number of tuning elements.

These and other objects of this invention achieved by providing a power amplifier in which a balun is employed in each stage of a broadband amplitude-amplification unit, which, due to the baluns, does not require tuning. The output of this unit is split for low power amplification in two channels, which are then combined by a power adder. The output of the adder is further amplified in a medium power amplifier whose output is impedance matched by the use of a strip line to the very low impedance of the input of a transistor, forming part of a broadband high power, high frequency amplifier.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
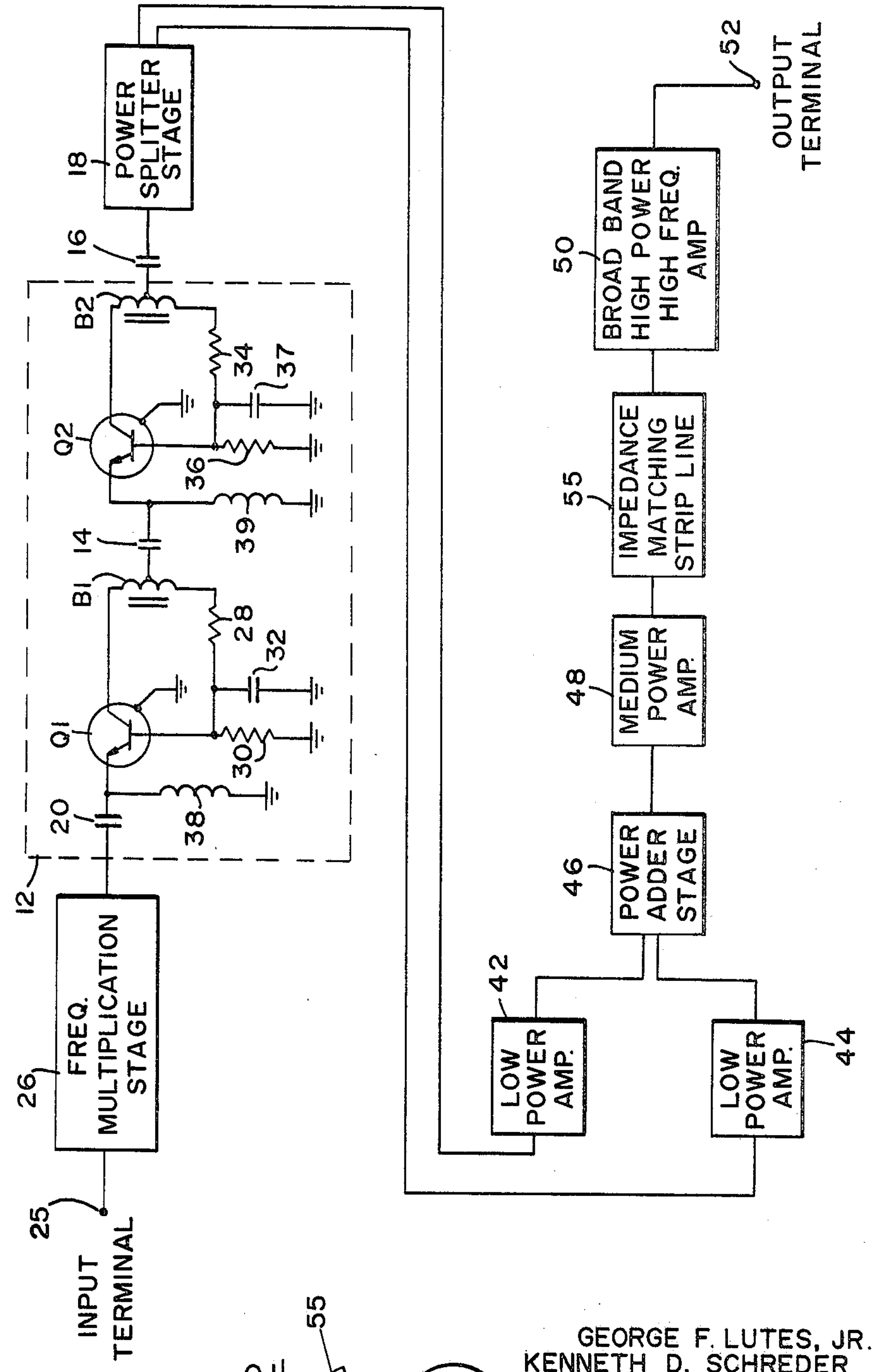
FIGURE 1 is a combination block and schematic diagram of the broadband stable power multiplier of the present invention.

Reference is first made to FIGURE 1 which is a combination block and schematic diagram of the circuit of the present invention. It is shown including two stages of an amplitude-amplification unit 12. Briefly, the unit includes transistors Q1 and Q2, each connected in a common base configuration and baluns B1 and B2, which are connected to the collectors of the transistors. The center terminal of balun B1 is connected through a capacitor 14 to the emitter of the transistor Q2 of the second stage. The center terminal of B2, representing the output of unit 12, is connected through a capacitor 16 to a power splitter stage 18. One end of a capacitor 20, connected at the other end to the emitter of Q1, forms the input of unit 12. The capacitor's end may be directly connected to the amplifier's input terminal 25, or through a frequency multiplication stage 26 in case the frequency at terminal 25 has to first be multiplied prior to the power amplification.

In unit 12, one end of B1 is connected to the base of Q1 through a resistor 28, with the base being connected to a reference potential, such as ground, through parallel connected resistor 30 and capacitor 32. Similarly, resistor 34 is connected between B2 and the base of Q2, and resistor 36 and capacitor 37 are each connected between the base and ground. Chokes or inductors 38 and 39 are connected respectively between the emitters of Q1 and Q2 and ground.

The use of the baluns B1 and B2 in th two stage unit 12 has been found to be most significant in contributing to the high gain of unit 12 over a wide frequency band without tuning. In one reduction to practice, the two baluns, when used with two transistors 2N918, have been found to produce uniform gain of 14 db between 180 and 280 mHz.

As shown in FIGURE 1, the output of unit 12 is supplied to power splitter stage 18 whose two outputs are supplied to low power amplifiers 42 and 44. The power-amplified outputs of these are supplied to a power adder stage 46. The function of stages 18 and 46 is to first separate the signal from unit 12 so that it can be separately power-amplified by relatively low power transistors in amplifiers 42 and 44, and then combine the power-amplified signals so that the output of stage 46 has a minimal preselected power gain.

In one reduction to practice, the output of unit 12 was amplified to 75 mw. in each of amplifiers 42 and 44 which included a low power transistor 2N918. Yet, the total power at the output of stage 46 was 150 mw. The output of stage 46 may further be amplified in a medium power amplifier 48, with final power amplification being achieved by a broadband high power, high frequency amplifier 50, whose output is connected to an output terminal 52.

As is appreciated by those familiar with the art, at the present state of the art, a transistor which is capable of providing a sufficient power gain, such as from 1 w. at its input to 4 w. at a high frequency, has a very low input impedance. For example, one such transistor is the NPN type 3TE450. Its input impedance when connected with a grounded emitter is in the range of 3–4 ohms, whereas the output impedance of the preceding amplifier 48 may be as high as 1K. In attempting to optimize the circuit's efficiency, it is necessary to match the impedances. However, due to the circuit's high frequency of operation of about several hundred mHz., use of lumped circuit techniques could not be used due to component self-resonance.

Figure 2:
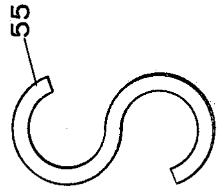
FIGURE 2 is a top view of an S-shaped strip line.

To overcome such impedance matching problems, in accordance with the teachings of the present invention, a quarter wave impedance transformation network or microstrip line 55 has been employed between the output and input of amplifiers 48 and 50 respectively. Briefly, the microstrip line raises the impedance of the base of a transistor in amplifier 50 to a reasonable value such as 50Ω, which can be matched using lumped circuitry. The shape of the strip line 55, one embodiment of which is diagrammed in FIGURE 2 to which reference is made herein, is dictated by the following considerations. It is necessary to reduce the physical length of the line due to size considerations. The line is curved into an S shape to prevent impedance discontinuities by maintaining a minimum radius. Coupling was prevented by requiring a minimum distance between parallel parts of the line. Using the above restraints, a reduction of 2.5 times in size was achieved.

The various stages and amplifiers, except for unit 12, are shown in FIGURE 1 in block form since, as is appreciated by those familiar with the art, known circuit techniques and arrangements may be employed to perform the functions assigned to them. Similarly, the power splitter stage 18 and power adder stage 46 are represented in block form since such stages or devices are known and commercially available. When the input at terminal 25 has to be frequency multiplied, stage 26 may consist of one or more frequency doublers.

Figure 3A:
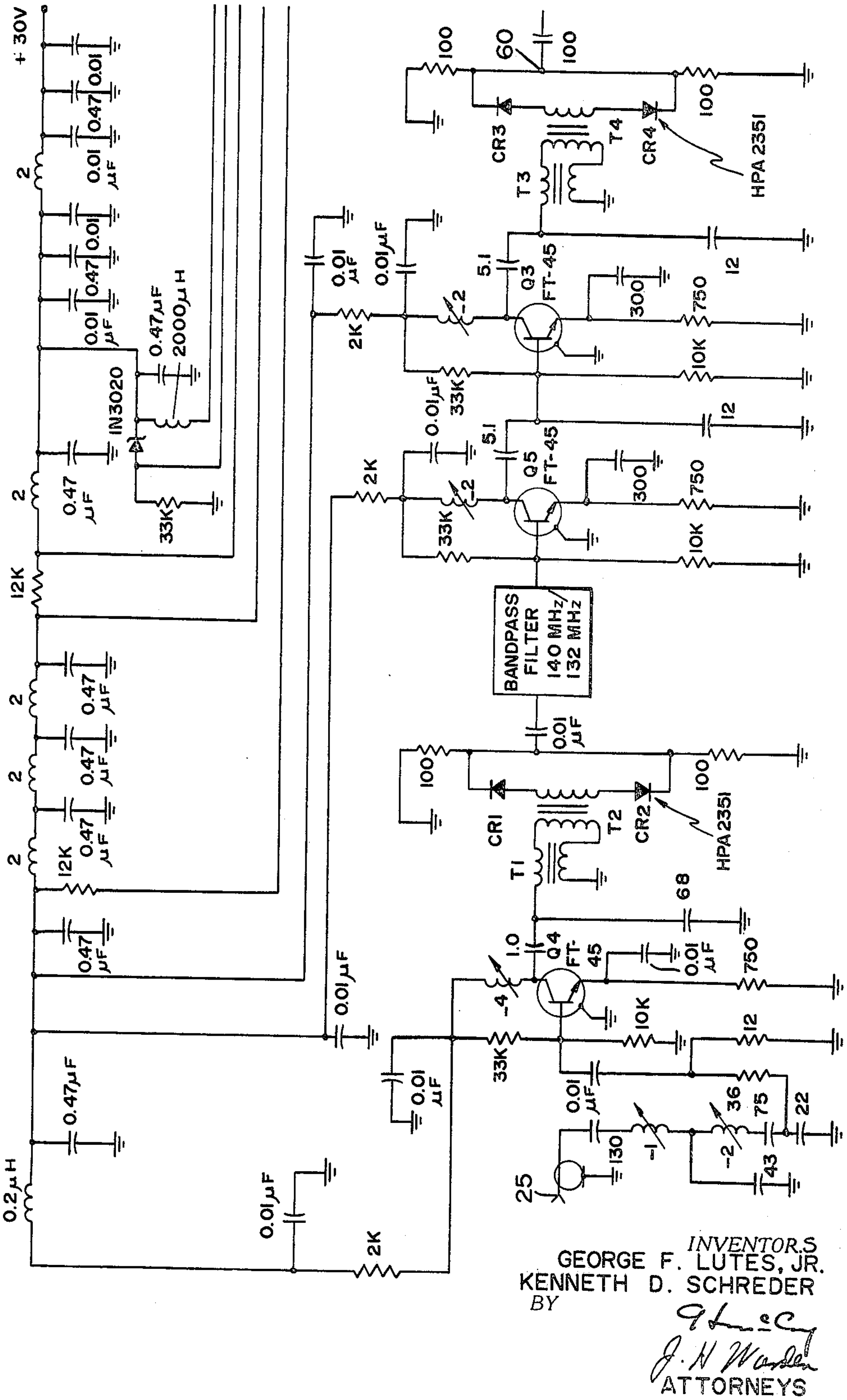
FIGURES 3A, 3B and 4 are respective left, center and right portions of a complete schematic diagram of one embodiment of the invention which was reduced to practice.
Figure 3B:
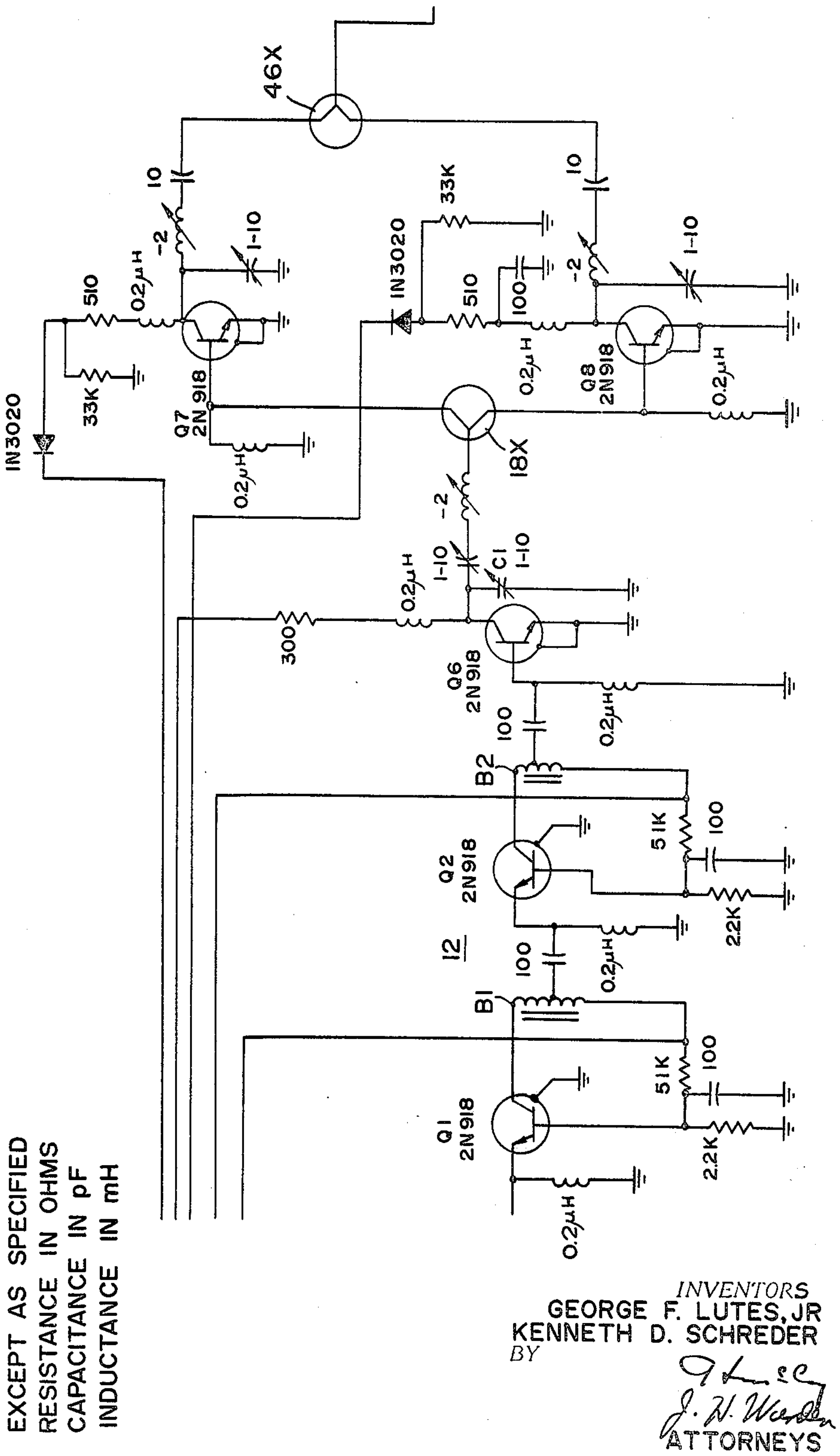
Figure 4:
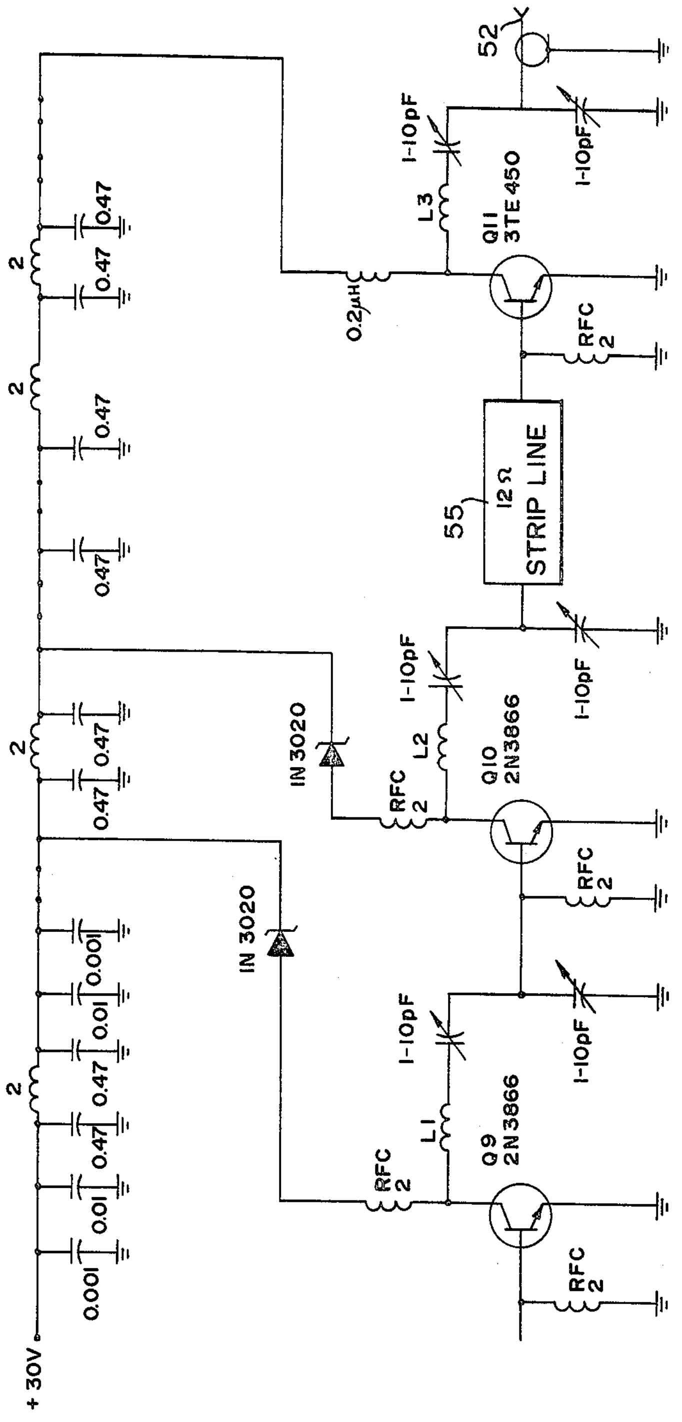

Reference is now made to FIGURES 3A, 3B and 4 which are left, center and righthand portions of a complete schematic diagram of a specific reduction to practice of the circuit of the present invention, employing the baluns and the impedance matching strip line. This specific arrangement which is shown to further exemplify and explain the invention, provides an ×4 frequency multiplier with a bandwidth of 24 mHz. at −3 db points about a center at 280 mHz., with a power gain of 50 db.

Therein the values of most components are as indicated. The values of the variable inductors designated −1, −2 and −4 are of the following respective ranges, 0.55–1.0 μh., 0.9–1.8 μh., and 3.2–8.3 μh. Inductors L1, L2 and L3 are made of 3 turns of #20 wire around a ⅜ inch diameter Bakelite core. Each of transformers T1, T2, T, T4 and baluns B1 and B2 is wound on a ferrite bead of the type made by Feroxcube Corporation of California type K500/100/3B. T1 and T3 are 10 turns bifilar #40 wire, T2 and T4 are 1 turn trifilar #40 and B1 and B2 are 1 turn bifilar #40 wire.

In FIGURE 3A, transistor Q4 and the various components of values as indicated, form an input and isolation amplifier, assumed to be provided with signals between 66 and 70 mHz. This amplifier isolates the input terminal 25 from the first doubler, formed by matched diodes CR1 and CR2. Also, the amplifier acts as a hard limiter to provide a constant voltage amplitude to the first doubler.

This doubler is a very broadband, full wave diode circuit with matched diodes to better suppress the fundamental frequency. The output of the doubler is supplied through a band pass filter of 132–140 mHz. to an amplifier, consisting of Q3, Q5 and associated components. The latter's output frequency is doubled by a second doubler with carefully matched diodes CR3 and CR4. The output terminal of this doubler is represented by junction point 60, tied to the input of unit 12, previously described.

The output of unit 12 is supplied to a drive amplifier which includes transistor Q6, required to drive power splitter 18X, a commercially available device, such as MV–50 manufactured by Adams-Russel. Q6 is shown as being a 2N918 transistor because of its high stability at 280 mHz. Q7 and Q8 and their associated components form low power amplifiers 42 and 44 (FIGURE 1) whose outputs are added by adder 46X.

The output of adder 46X is supplied to a two stage medium power amplifier 48, consisting of Q9 and Q10. The collector of Q10 is connected through serially connected inductor L2 and two variable capacitors 1–10 pf. to ground. The junction of the two capacitors is connected to one end of a 12.5Ω strip line 55, the other end of which is connected to the base of Q11 which forms the broadband high power, high frequency output amplifier. In addition, in FIGURES 3A, 3B and 4, an RF DC power filter is shown, the function of which is to filter the DC operating or biasing voltage supplied to the various transistors from a voltage source, such as a source of 30 v. DC.

From FIGURES 3A, 3B and 4, the number of tuning elements can be seen to total only 17 with a total of eleven transistors. The final power amplifiers Q9 and Q10 require two tuning capacitors each for center frequency adjustment and power matching. The simple circuits and the relatively few tuning elements allow for the tuning of the circuit in successive order when using full input power of +13 dbm. and rated voltage of +30 v. DC.

The output load may be removed with full input power applied without damaging any of the transistors. Rated output power of about 4 watts is achieved again when the load is replaced. For such output power with a center frequency of 280 mHz., the symmetrical −1 db down points on the spectrum curve are 16 mHz. apart and the symmetrical −3 db down points are 24 mHz. apart. The input voltage standing wave ratio (VSWR) is less than 1.10 over the entire −3 db bandwidth points for input power variations between +7 and +19 dbm. The described embodiment has been packaged into a volume of less than 300 cubic inches.

There has accordingly been shown and described herein a novel broadband stable high frequency power multiplier. It incorporates a balun in each stage of an amplitude-amplification unit to achieve broadband impedance transformation, without tuning. The multiplier also includes a strip line used as an impedance matching device between the relatively high output impedance of one power amplifier and the very low input impedance of a high power, high frequency transistor, employed in the last amplification stage.

It should be appreciated that those familiar with the art may make modifications and/or substitute equivalents without departing from the true spirit of the invention. Thus, all such modifications and/or equivalents are deemed to fall within the scope of the appended claims.

What is claimed is:

1. A broadband power amplifier comprising:

input amplifying means responsive to input signals in a preselected frequency bandwidth for amplifying said signals, said input amplifying means including at least one non-tunable broadband impedance transforming device;

power means responsive to said amplified signals for amplifying the power thereof, said input amplifying means including at least one transistor having base, emitter and collector electrodes and connected in a common base configuration, and said impedance transforming device has first and second terminals coupled between said collector and base electrodes and a third terminal connected to said power means; and said power means include a power transistor having a base, an emitter and a collector, said power transistor being connected in a common emitter configuration having broadband high power high frequency characteristics, and strip line means connected between the base of said power transistor and said input amplifying means to raise the input impedance of said power transistor, said bandwidth being in the range of at least 20 megahertz.

2. A broadband power amplifier comprising:

a power amplification stage;

input means for supplying signals in a preselected frequency bandwidth to said power amplification stage for power amplification therein, said power amplification stage including a power transistor connected in a common emitter configuration and having broadband, high power, high frequency characteristics and a low input impedance at a base terminal thereof; and strip line means connecting said input means to said power amplification stage to raise the base input impedance of said power transistor, said input means including signal amplitude amplifying means comprising at least first and second transistors each connected in a common base configuration, with a nontunable broadband impedance transforming device coupled between the collector and base electrodes of each of said transistors, the center frequency of said bandwidth being in the range of several hundred megahertz and the bandwidth being at least 10 megahertz.

3. In an amplifier operable over a frequency band of at least 15 megahertz with a center frequency in the range of several hundred megahertz, the arrangement comprising:

input means for receiving signals having frequencies in a band of at least 15 megahertz said frequencies including a frequency of several hundred megahertz;

power amplifying means including a power transistor having a base, an emitter and a collector, connected in a common emitter configuration, the base input impedance being less than a few ohms; and strip line means coupled between said base and said input means for raising the base input impedance of said power transistor to a value in the range of 50 ohms.

References Cited

UNITED STATES PATENTS

| | | | |
|---|---|---|---|
| 2,463,229 | 3/1949 | Wheeler | 330—53 |
| 2,802,066 | 8/1957 | Woll | 330—154 |
| 2,897,460 | 7/1959 | La Rosa | 333—84 |
| 3,110,869 | 11/1963 | Smith-Vaniz et al. | 330—154 |
| 3,119,965 | 1/1964 | Phillips | 330—56 |
| 3,139,597 | 6/1964 | French et al. | 333—84 |
| 3,419,813 | 12/1968 | Kamnitsis | 330—31 |

JOHN KOMINSKI, Primary Examiner

U.S. Cl. X.R.

330—14, 20, 30, 53, 116, 154; 331—53; 333—32, 84